United States Patent Office.

F. J. BURCHAM, OF RACINE, WISCONSIN, ASSIGNOR TO HIMSELF AND L. S. BLAKE, OF SAME PLACE.

Letters Patent No. 78,256, dated May 26, 1868.

IMPROVED PROCESS OF TANNING HIDES AND SKINS.

The Schedule referred to in these Letters Patent and making part of the same.

TO ALL WHOM IT MAY CONCERN:

Be it known that I, F. J. BURCHAM, of Racine, in the county of Racine, and State of Wisconsin, have invented a new and improved Process for Tanning Hides and Skins; and I do hereby declare that the following is a full, clear, and exact description thereof, which will enable others skilled in the art to make and use the same.

The nature of my invention relates to improvements in tanning hides and skins, and consists in the hereinafter-described process for accomplishing the same, whereby it is designed to accomplish the same in a more expeditious and economical manner than by the process now known and practised, and whereby they are tanned either with the hair on or off.

In carrying out my improved process, I take a quantity, say, from thirty to sixty hides, and soak them in water until soft, then flesh and beam them. I then prepare a vat of suitable dimensions, and fill it about three-quarters full of water, then put in one and one-half bushel of salt, and a half gallon sulphuric acid, stirring them well together. I then put in the hides, and handle them three times a day for two days, leaving them up over each night, then put in again same amount of salt and acid, and repeat the same operation for the same length of time, then, if the tan has struck through, which will be indicated by a dead white or cream color, I hang them up and let them become half dry, then swab them on the flesh side with a strong liquor of bark or japonica three times, until thoroughly soaked, letting them get about half dry each time before putting on the liquor, then hang them up until half dry again, or, as is understood by tanners, until they come to a "sammed state," then repeat the swabbing operation three times. I then expose them to the operation of a suitable machine for softening and dressing leather, as, for instance, the machine known as F. J. Burcham's, for from three to five minutes, then hang them up until half dry. Then shave and swab them with strong tan-liquor in which there has been dissolved a half pound of alum to the gallon of liquor, and at the same time swab them well with kerosene-oil, then hang them up, and let them "sammey," then stuff them well with equal parts of neat's-foot oil and melted tallow. After they are dry, put them through the softening and dressing-machine again.

For removing the hair from the hides, in addition to the above-described process, they are exposed to the action of three bushels of unslaked lime and three pounds of potash dissolved in a vat of rain-water.

Having thus fully described my invention, what I claim, and desire to secure by Letters Patent, is—

The herein-described process for tanning hides and skins, substantially as and for the purpose described.

F. J. BURCHAM.

Witnesses:
D. McDONALD,
JOHN A. DULL.